US011249978B2

(12) United States Patent
Bandyopadhyay et al.

(10) Patent No.: US 11,249,978 B2
(45) Date of Patent: Feb. 15, 2022

(54) MULTIPLE PARAMETER BASED COMPOSITE RULE DATA VALIDATION

(71) Applicant: KYNDRYL, INC., New York, NY (US)

(72) Inventors: Santanu Bandyopadhyay, Kolkata (IN); Ramesh Chandra Pathak, Bangalore (IN); Vishal Anand, Dublin (IE); Suryanarayana Rao, Bangalore (IN)

(73) Assignee: Kyndryl, Inc., New York, NY (US)

( * ) Notice: Subject to any disclaimer, the term of this patent is extended or adjusted under 35 U.S.C. 154(b) by 41 days.

(21) Appl. No.: 16/203,802

(22) Filed: Nov. 29, 2018

(65) Prior Publication Data

US 2020/0175120 A1 Jun. 4, 2020

(51) Int. Cl.
*G06F 16/00* (2019.01)
*G06F 16/23* (2019.01)
*G06F 9/455* (2018.01)

(52) U.S. Cl.
CPC .......... *G06F 16/2365* (2019.01); *G06F 9/455* (2013.01)

(58) Field of Classification Search
CPC ........ G06F 7/00; G06F 40/174; G06F 16/215; G06F 16/2365; G06F 17/30371; G06F 16/00; G06F 16/1734; G06F 16/219; G06F 16/24564; G06F 16/24565; G06F 16/254; G06F 16/951; G06F 17/243; G06F 17/30; G06F 17/30144; G06F 17/30309; G06F 17/30507; G06F 17/3051; G06F 17/30563; G06F 17/30864; G06F 8/10; G06F 8/30; G06F 8/20; G06F 9/4433; G06F 9/4492; G06F 11/0709; G06F 11/0793; G06F 11/1482; G06F 16/337; G06F 2209/463; G06F 3/00; G06F 9/455; G06F 9/46;
(Continued)

(56) References Cited

U.S. PATENT DOCUMENTS

| 7,366,977 | B2 | 4/2008 | Chokshi |
| 7,630,986 | B1 * | 12/2009 | Herz ............... G06Q 10/10 |
| 8,001,525 | B2 | 8/2011 | Agostini |
| 8,064,703 | B2 | 11/2011 | Newcomer |
| 8,468,167 | B2 | 6/2013 | Sathyanarayana |
| 8,996,980 | B2 | 3/2015 | Chokshi |

(Continued)

FOREIGN PATENT DOCUMENTS

| WO | 2001057720 A3 | 2/2002 |
| WO | 2015138666 A1 | 9/2015 |

OTHER PUBLICATIONS

Mell, Peter et al.; "The NIST Definition of Cloud Computing;" National Institute of Standards and Technology; Special Publication 800-145; Sep. 2011; 7 pages.

*Primary Examiner* — Shyue Jiunn Hwa
(74) *Attorney, Agent, or Firm* — Schmeiser, Olsen & Watts, LLP; Ken Han

(57) ABSTRACT

A system and method for multiple parameter based composite rule data validation includes receiving a request to validate target data of a target object based on constituent parameters, identifying the data type of the target data, suggesting validation rules based on the data type of the target object, generating a set of composite validation queries, identifying at least one composite validation query in the set of composite validation queries corresponding to the constituent parameters and values, validating the target data of the target object against the at least one composite validation query, and returning a validation result for the target data.

20 Claims, 7 Drawing Sheets

(58) Field of Classification Search
CPC ...... G06F 9/465; G06F 9/541; G06F 11/3006; G06F 11/3466; G06F 16/11; G06F 16/835; G06F 8/35; G06F 8/34; G06F 8/36; G06F 16/9535; G06F 8/73; G06F 16/2457; G06F 16/289; G06F 8/24; G06F 8/443; G06F 11/3664; G06F 11/3688; G06F 3/0481; G06F 9/451; G06F 11/3608; G06F 16/211; G06F 21/554; G06F 21/604; G06F 21/6218; G06F 2221/032; G06F 2221/2141; G06F 40/154; G06F 40/186; G06F 8/41; G06F 8/60; G06F 8/70; G06F 9/547; G06F 11/3612; G06F 11/366; G06F 11/3672; G06F 11/368; G06F 11/3692; G06F 16/212; G06F 16/2291; G06F 16/245; G06F 16/24575; G06F 16/248; G06F 16/252; G06F 16/284; G06F 16/285; G06F 16/3329; G06F 16/9577; G06F 2209/509; G06F 3/14; G06F 3/1454; G06F 9/5055; G06F 16/288; G06F 21/6227; G06F 21/64; G06F 30/20; G06F 17/18; G06F 30/392; G06F 30/398; G06F 40/35; G06F 40/58; G06F 30/30; G06F 8/43; G06F 9/06

See application file for complete search history.

(56) References Cited

U.S. PATENT DOCUMENTS

| | | | |
|---|---|---|---|
| 9,152,627 | B2 | 10/2015 | Kung |
| 9,210,030 | B1 | 12/2015 | Miller |
| 9,460,077 | B1 | 10/2016 | Casey |
| 9,602,519 | B2 | 3/2017 | Miller |
| 9,626,393 | B2 | 4/2017 | Gould |
| 10,515,119 | B2 * | 12/2019 | Kirk .................. G06F 16/24578 |
| 2005/0240943 | A1 * | 10/2005 | Smith ..................... G06F 9/465 |
| | | | 719/328 |
| 2007/0005786 | A1 * | 1/2007 | Kumar .................. H04L 45/563 |
| | | | 709/230 |
| 2012/0272221 | A1 | 10/2012 | Pessoa |
| 2013/0067308 | A1 | 3/2013 | Chokshi |
| 2013/0067309 | A1 | 3/2013 | Chokshi |
| 2013/0097664 | A1 * | 4/2013 | Herz ...................... G06Q 10/10 |
| | | | 726/1 |
| 2013/0166515 | A1 | 6/2013 | Kung |
| 2013/0204610 | A1 * | 8/2013 | Wu ........................ G06F 40/35 |
| | | | 704/9 |
| 2015/0161193 | A1 * | 6/2015 | Damodar ............ G06F 16/2365 |
| | | | 707/694 |
| 2015/0261796 | A1 | 9/2015 | Gould |
| 2015/0261824 | A1 | 9/2015 | Jha |
| 2015/0269157 | A1 * | 9/2015 | Biem .................... G06N 20/00 |
| | | | 707/603 |
| 2020/0073979 | A1 * | 3/2020 | Bandyopadhyay ... G06F 16/835 |

* cited by examiner

MULTIPLE PARAMETER BASED COMPOSITE RULE DATA VALIDATION

TECHNICAL FIELD

The present invention relates generally to systems and methods for data validation. More specifically, the present invention relates to systems and methods for multi-tier data validation based on composite validation rules and multiple parameters.

BACKGROUND

Currently, approaches to validate data are limited to target data validation based on simple validation rule(s) wherein target data is identified to be validated using an identified validation rule. Alternatively, data validation requires the use of complex coding logic. No solutions exist today which allow for a mechanism by which application validation can be performed without hardcoding logic inside the applications.

SUMMARY

An embodiment of the present invention relates to a method, and associated computer system and computer program product, for multiple parameter based composite rule wise data validation. One or more processors of a computer system receive a request to validate target data of a target object based on constituent parameters. The one or more processors of the computer system identify a data type of the target data. The one or more processors of the computer system suggest validation rules based on the data type of the target object, constituent parameters, and constituent parameter values. The one or more processors of the computer system generate a set of composite validation queries. The one or more processors of the computer system identify at least one composite validation query in the set of composite validation queries corresponding to the constituent parameters and values. The one or more processors of the computer system validate the target data of the target object against the at least one composite validation query. The one or more processors of the computer system return a validation result for the target data of the target object.

Another embodiment of the present invention relates to a method, and associated computer system and computer program product, for multiple parameter based composite rule wise data validation. One or more processors of a computer system store a set of composite validation queries in key-value pair format. The one or more processors of the computer system form a constituent parameter key pair based on the values of the constituent parameters in a request to validate data. The one or more processors of the computer system identify at least one composite validation query by matching the constituent parameter key pair to at least one corresponding composite validation query key pair.

DETAILED DESCRIPTION

Figure 1:
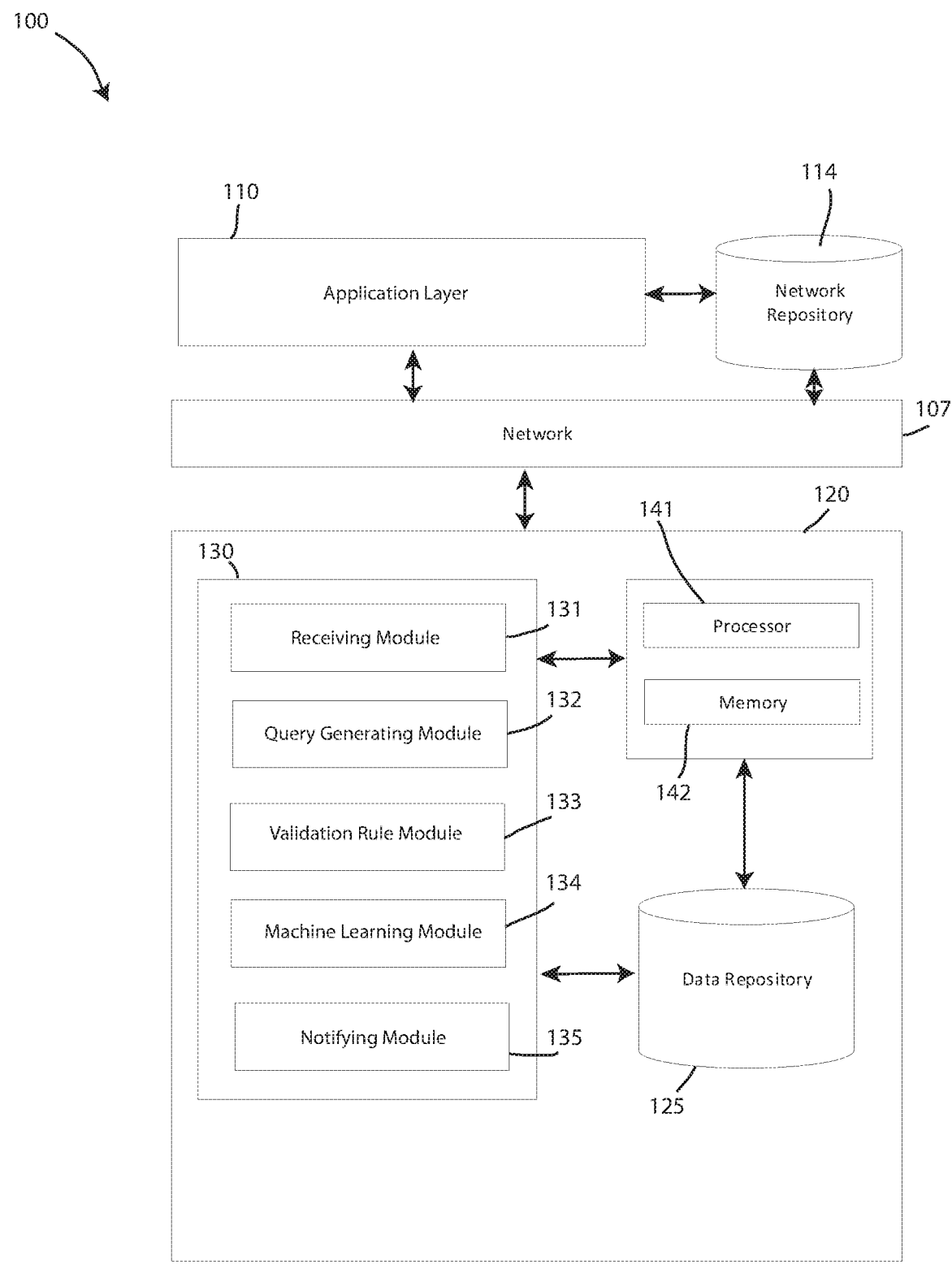
FIG. 1 depicts a block diagram of a system for multiple parameter based composite rule wise data validation, in accordance with embodiments of the present invention.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

In any client/server application there is frequently the need to validate a particular target data object against composite validation rules. Composite validation rules refer to the situation where one/multiple validation rule(s) required to be applied to a target data item based on the values of multiple parameters controlling the data processing of the application. There currently exists a problem of validating target data of a target object against particular set of validation rules which is dependent on the combination of constituent parameters which are controlling the application. In short, the problem involves cases which require logical multiple parameter based composite rule validation of a target data item of a target data object.

Currently, approaches for data validation consist of target data validation based on simple validation rule(s). This approach uses simple validation rules to validate the data. For example, this approach would involve a request to validate target data A of the target data of the target object. The approach would use validation rule criteria X to validate the target data of the target object. However, this this approach will fail for composite validation rules mentioned above. This approach cannot validate the data if the target data item of the target object needs to be validated against criteria X1 when given values of identified parameters.

To overcome this shortcoming, systems and methods typically rely on complex coding logic using the steps of (1) a request to validate target data A of the target data of the target object; (2) using validation rule criteria X to validate the target data of the target object; (3) getting all the validation result configured for that particular target data item for the data object; and (4) hard coding the composite logic with an if else algorithm and picking up the validation result. However, this approach makes the system unnecessarily complex. As a result the application becomes unmanageable. This approach is also very costly and is extremely time consuming. Moreover, this approach makes the application much more error prone. Additional coding cannot be integrated with the existing systems and methods to obtain composite validation rule based validation because that will make the application much more complex than necessary and unmanageable.

As such, there exists a need in the field for a system and method which avoids unnecessary complexity when validating target data items of target objects based on constituent parameters and their values. The present invention, when practiced, will deliver a solution of the known deficiencies in the art by providing a simple mechanism of validating target data of a target data object based on constituent parameter and their values for a particular application. Embodiments of the present invention will improve computer functionality by validating a target data item of target data object without performing any application code and therein improving the efficiency, accuracy, and speed of validation. Furthermore, the present invention will result in an improvement in computer and data validation technology by reducing computer resource usage by offering a centralized validation engine for multiple applications to offload validation logic and rules. Additionally, the present invention will decrease the complexity of validation technology by utilizing a separate validation layer which analyzes various parameters required for composite validation rules and also generates the composite validation rules therein. Moreover, an embodiment of the present invention can identify the target data to be validated from a request and therein automatically identify the primary criteria against which the target data needs to be validated, increasing the speed and efficiency of data validation. The present invention advantageously cognitively suggests primary validation rules based on data type of the target data, parameters and parameter values of a particular request improving the speed and decreasing the complexity of the data validation.

FIG. 1 depicts a block diagram of a system for multiple parameter based composite rule wise data validation 100, in accordance with embodiments of the present invention. Embodiments of a system for multiple parameter based composite rule wise data validation 100 may be described as a system for logical multiple parameter based composite rule validation of a target data item of a target data object. Embodiments of a system for multiple parameter based composite rule wise data validation 100 may also be described as a system for providing a separate validation layer apart from an application layer so that the validation layer and application layer are able to evolve independently and so that a single validation layer can be utilized by multiple applications. The system for multiple parameter based composite rule wise data validation 100 may receive a request to validate target data of a target object based on constituent parameters from the application layer 110. Constituent parameters may be any criteria or constraint used in the process of data validation. For example, in one embodiment, the constituent parameters may include a request state, a user role, or a document state.

Embodiments of the application layer 110 may include any data processing application. The application layer 110 may include an application wherein any particular target data of a target object need to be validated based on the values of multiple constituent parameters. The application may initiate a request to validate Target Data 1 (TD1), Target Data 2 (TD2) . . . Target Data n (TDn) based on values of constituent parameters which may be request state, user role, document state. It should be understood that the process described herein may only discuss or describe a single target data (such as TD1), but the same system and method applies up to TDN in a concurrent processing approach.

While only one application layer 110 is shown, the number of application layers connecting to computer system 120 over network 107 may vary from embodiment to embodiment. Computer system 120 may also be described as the validation layer. For example, there may a plurality of application layers 110 connecting to computer system 120, wherein the application layers have a common validation rule set. In other embodiments, there may be multiple application layers 110 connection to computer system 120 wherein the application layers 110 are in a cluster environment. Still further, it should be understood that a plurality of unrelated application layers 110 may be connected to computer system 120 over network 107.

A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computer system 120 and the application layer 110, a connection to one or more network accessible knowledge bases containing information of one or more users or applications, network repositories 114 or other systems connected to the network 107 that may be considered nodes of the network 107. In some embodiments, where the computer system 120 or network repositories 114 allocate resources to be used by the other nodes of the network 107, the computer system 120 and network repository 114 may be referred to as servers.

The network repository 114 may be a data collection area on the network 107 which may back up and save all the data transmitted back and forth between the nodes of the network 107. For example, the network repository 114 may be a data center saving and cataloging user data sent by the application layer 110 to generate both historical and predictive reports regarding a data validation, constituent parameters, or validation rules. In some embodiments, a data collection center housing the network repository 114 may include an analytic module capable of analyzing each piece of data being stored by the network repository 114. Further, the computer system 120 may be integrated with or as a part of the data collection center housing the network repository 114. In some alternative embodiments, the network repository 114 may be a local repository (not shown) that is connected to the computer system 120.

Embodiments of the computer system 120 may include a receiving module 131, a query generation module 132, a validation rule module 133, a machine learning module 134, and a notifying module 135. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the receiving module 131 may include one or more components of hardware and/or software program code for obtaining, retrieving, collecting, or otherwise receiving information from the system for multiple parameter based composite rule wise data validation 100. In one embodiment, the receiving module 131 may be configured for receiving information directly from the application layer 110. For example, the receiving module 131 may receive a request from the application layer 110 include target data of a target object to be validated based on constituent parameters. The request may include which constituent parameters the validation is to be based on and the currently configured constituent parameter values. For example, in one embodiment, the request may include that the constituent parameters are the request state, the user role, and the document state and the currently configured constituent parameter values are draft (request state), RIPC (user role), and in progress (document state). Embodiments of the application layer 110 may be a component of the computer system 120, or may be external to the computer system 120, and connected to the computer system 120 over network 107. The receiving module 131 may provide information received by the computer system 120 from the application layer 110 to be stored in the data repository 125.

Referring still to FIG. 1, embodiments of the computer system 120 may further include the query generating module 132. The query generating module 132 may be described as the logical composite validation query generator. Embodiments of the query generating module 132 may be configured to parse the request from the application layer 110 and identify the target data of the target object which needs to be validated and determine the constituent parameters which the validation is to be based upon. The query generating module 132 may be enabled to cognitively suggest or recommend validation rules based on the data type of the target data. The validation rules may be loaded or obtained from a stored location, such as data repository 125. In some embodiments, data repository 125 may be described as a validation rule dictionary. The validation rules may be a composite validation rule set. The validation rules may also be described as validation criteria or validation queries. The suggested or recommended validation rules may be described as the primary validation rules or criteria.

The query generating module 132 may then load the currently configured constituent parameter values from the request. The query generating module 132 may then be configured to obtain all the possible values and combinations for the constituent parameters in the request and form a key value combination for the same. Each combination is the appended with the primary validation criteria resulting in the formation of composite validation criteria or rules. Below are example composite validation rules:

Validate the target data with X1 criteria when the constituent parameter values are draft (request state), RIPC (user role), and in progress (document state);
Validate the data with X2 and X1 criteria when the constituent parameter values are Submitted to Buyer (request state), RIPC (user role), and in progress (document state);
Validate the data with X3 AND X1 AND X2 criteria when the values are Draft (request state), RIPC (user role), and in progress (document state);
Validate the data with X4 OR X1 criteria when the values are Submitted to Buyer (request state), buyer (user role), and in progress (document state); and
Validate the data with X5 AND X5 criteria when the values are Draft (request state), RIPC (user role), on Hold (document state).

Criteria X2 and X1 may be, for example, field size limit, only numbers field, or the like. In this manner, the query generating module 132 generates all the composite validation rules or queries required for the target object identified on the run time. The query generating module 132 may be configured to store the composite validation criteria in key value pair with the key as the data item and the value as the composite validation rule based on the constituent parameter. In general, composite validation rules refer to one or multiple rule(s) required to be applied to a target data item based on the values of multiple parameters controlling the data processing of the application.

Embodiments of the computer system 120 may include a validation rule module 133. The validation rule module 133 may be described as a composite validation rule validator. The validation rule module 133 may be configured to parse the client request and identify the values of the configured constituent parameters. The validation rule module 133 may then be enabled to form a single combination of the constituent parameters key and value based on the values of the currently configured constituent parameters, which may be obtained from the request from the application layer 110. The validation rule module 133 may also be configured to search the composite validation criteria or rules generated by the query generating module 132 to obtain or identify the corresponding validation composite rule to the currently configured constituent parameter values. The validation rule module 133 may then be enabled to execute the identified validation composite rule against the target data of the target object. In this way, the validation rule module 133 is enabled to validate the target data based on multiple parameters and composite validation rules.

With continued reference to FIG. 1, embodiments of computer system 120 may include a machine learning module 134. The machine learning module 134 may be configured for detecting errors within other components of computer system 120. For example, the machine learning module may detect errors within the query generating module 132 or the validation rule module 133. For example, the machine learning module 134 may detect an error when the query generating module attempts to generate the composite validation rules. The machine learning module 134 may also detect an error when the validation rule module 133 attempts to execute the identified composite validation composite rule against the target data.

Additionally, the machine learning module 134 may be configured to analyze the error. For example, the error may be that there is no validation rule stored in the computer system 120 or the data repository 125 corresponding to a particular constituent parameter. Another error may be no composite validation rule can be identified based on currently configured constituent parameter values. Once the error is analyzed and identified, the machine learning module 134 may be configured to determine the data type of the target data and the target object. The machine learning module 134 may be configured to obtain a new primary validation rule set based on the data type. The new primary validation rule set may be obtained from the application layer 110, the network repository 114, or one or more network accessible knowledge bases. For example, the new primary validation rule set may be obtained from the network repository 114 or requested from the application layer 110. The machine learning module 134 may then store the new primary validation rule set in the data repository 125 with the data type. In this way, the data repository 125 may be continually growing, improving, and learning such that the query generating module 132 may suggest more and more accurate primary validation rule sets as the system is used. Thus, the functioning of the computer system 120 is improved by allowing for accurate cognitive suggestions of primary validation rules based on data type.

Embodiments of the computer system 120 may also include a notifying module 135 for notifying or returning the validation results. The notifying module 135 may be configured to determine the validation result from the validation rule module 133. The notifying module 135 may return a validation result as a response to the request for validation from the application layer 110. The notifying module 135 may provide the result directly to the application layer 110 through the network 107. The validation result may be provided in JavaScript Object Notation (JSON) or XML Metadata Interchange (XMI) format to the application layer 110 by the notifying module 135.

Referring still to FIG. 1, embodiments of the computer system 120 may be equipped with a memory device 142 which may store the validation rules, data type, validation requests, constituent parameters and values, and the like, and a processor 141 for implementing the tasks associated with the system for multiple parameter based composite rule wise data validation 100.

As such, the system for multiple parameter based composite rule wise data validation 100 may be enabled to utilize a separate validation layer (such as computer system 120) that analyzes various constituent parameters required for composite validation rules and then generates the composite validation rules based on the constituent parameter values. Further, the system for multiple parameter based composite rule wise data validation 100 may be enabled to identify target data to be validated from a request and identify the primary criteria against which the target data needs to be validated. Still further, the system for multiple parameter based composite rule wise data validation 100 is able to cognitively suggest primary validation rules based on the data type of the target object, constituent parameters, and the constituent parameter values for a particular configuration of an application. Thus, embodiments of the present invention are able to validate target data of a target object without performing any application code and provide a centralized validation engine for multiple applications to offload their validation logic and rules.

Figure 2:
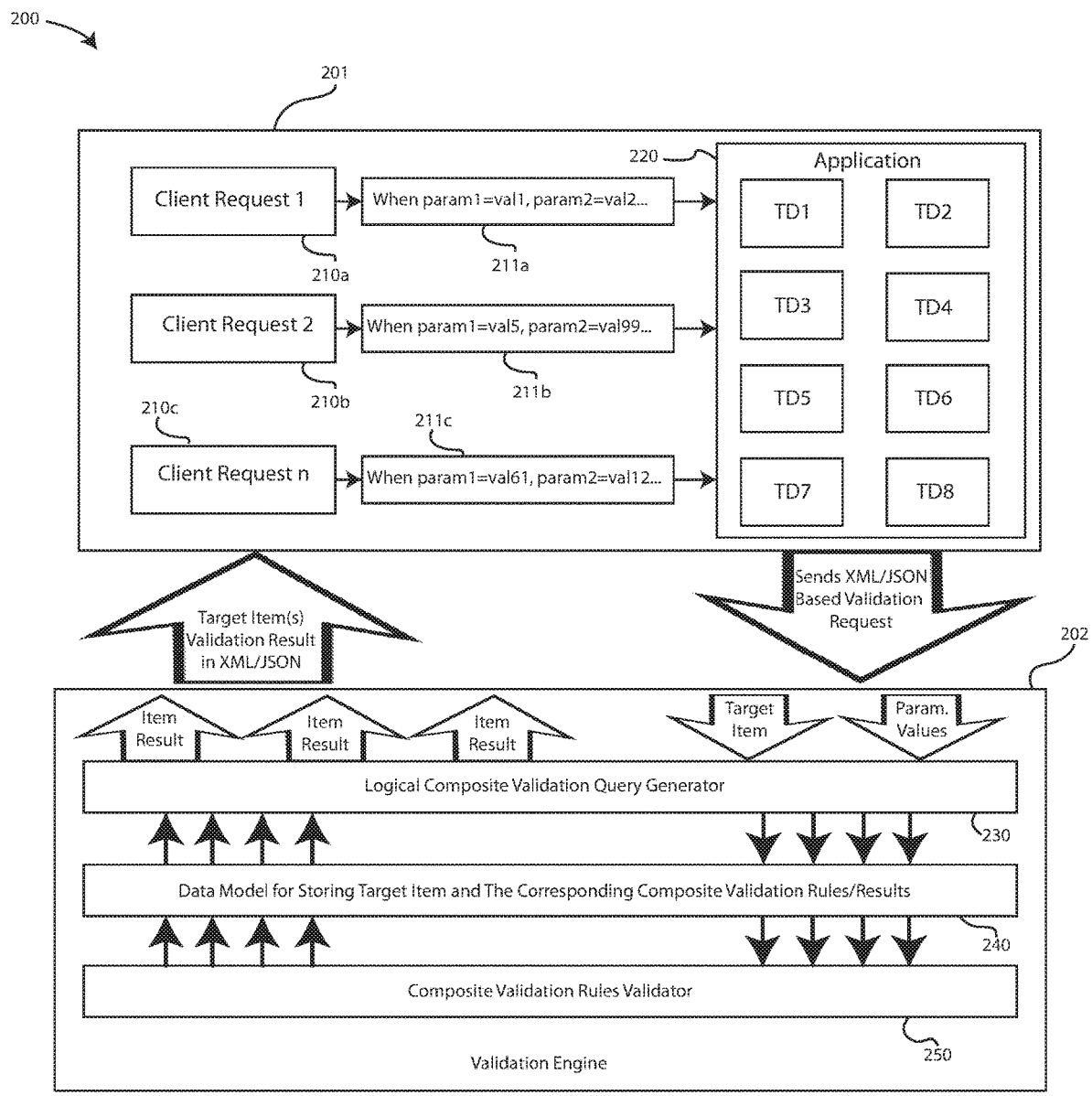
FIG. 2 illustrates a block diagram of system architecture for the system for multiple parameter based composite rule wise data validation, in accordance with embodiments of the present invention.

FIG. 2 illustrates a block diagram of system architecture 200 for the system for multiple parameter based composite rule wise data validation, in accordance with embodiments of the present invention. The system architecture 200 can be described as a validation engine. The system architecture 200 includes an application layer 201 and a separate validation layer 202. The validation layer 202 may be described as a validation engine. The application layer 201 is shown include client requests 210a, 210b, and 210c. It should be understood that the application layer may include any number of client requests, indicated by "client request n" in client request 210c. The client requests 210a, 210b, and 210c have corresponding constituent parameters and constituent parameter values 211a, 211b, and 211c. The application layer 201 may also include a target object 220 having target data TD1, TD2, TD3, TD4, TD5, TD6, TD7, and TDB. It should be understood that the application layer 201 may include any number of target objects having any number of target data to be validated.

The application layer 201 sends a validation request, in XML or JSON format, to the validation layer 202. The validation layer 202 parses the request into target items (data) and parameters and parameter values which are sent to a logical composite validation query generator 230. In one embodiment, the logical composite validation query generator 230 may be the query generating module 132 of FIG. 1. The logical composite validation query generator 230 may generate composite validation rules or queries, in a manner described in more detail herein. The validation layer 202 may also include a data model for storing target items and the corresponding composite validation rules and results 240. The logical composite validation query generator 230 may send data and information to be stored in the data model for storing target items and the corresponding composite validation rules and results 240. The validation layer 202 may also include a composite validation rules validator 250. In one embodiment, the composite validation rules validator may be the validation rule module 133 of FIG. 1. The composite validation rules validator 250 may be configured for executing routines to validate the target data based on composite validation rules. The composite validation rules validator 250 may then return a validation result to data model for storing target items and the corresponding composite validation rules and results 240. The data model for storing target items and the corresponding composite validation rules and results 240 may then return the result to the logical composite validation query generator 230. The validation layer 202 may then be enabled to return a validation result of the target items (data) to the application layer 201 in XML or JSON format.

Figure 3:
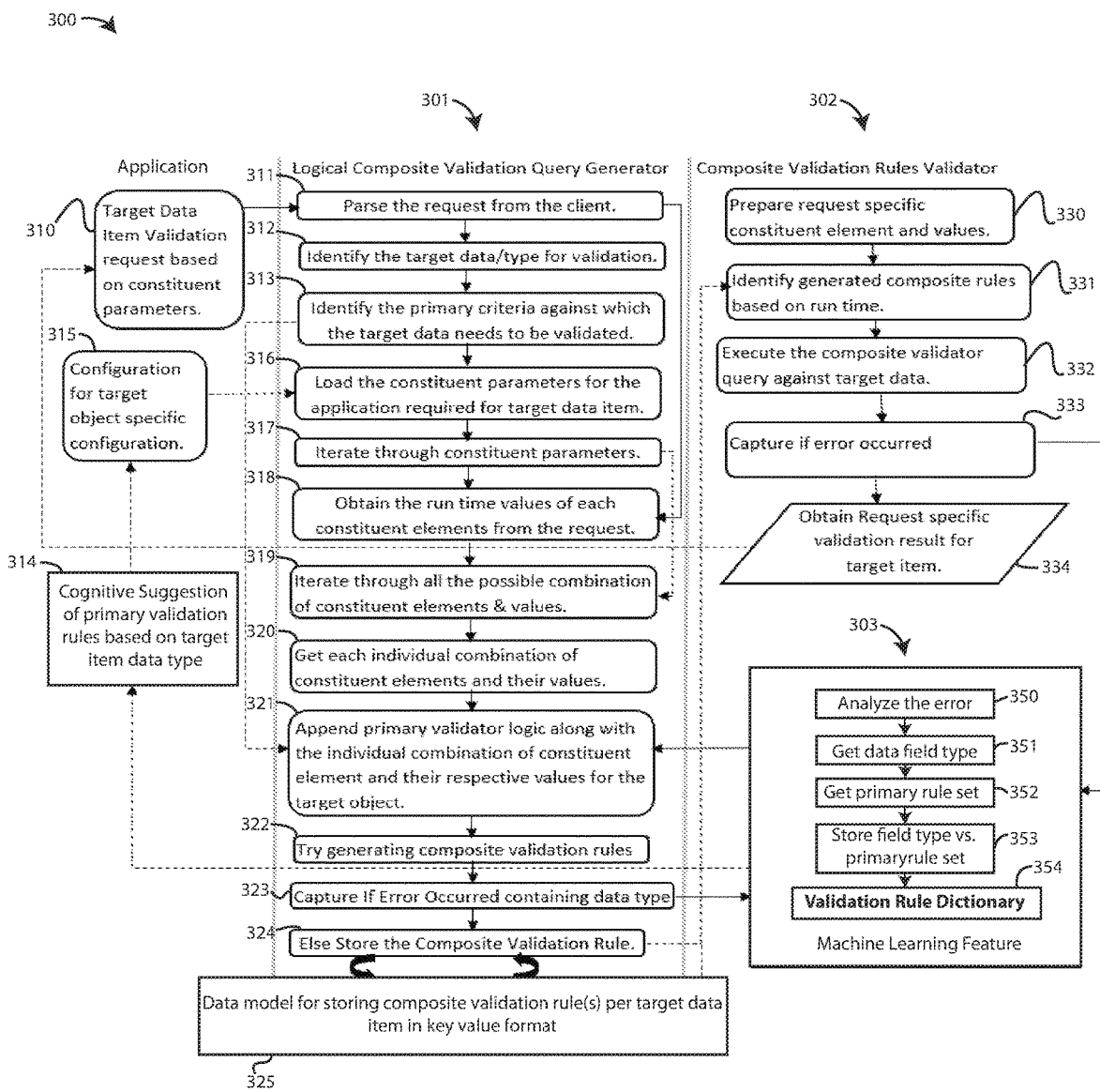
FIG. 3 depicts a flowchart of a method for multiple parameter based composite rule wise data validation, in accordance with embodiments of the present invention.

FIG. 3 depicts a flowchart of a method 300 for multiple parameter based composite rule wise data validation, in accordance with embodiments of the present invention. The method 300 includes a logical composite validation query generator method 301, a composite validation rules validator method 302, and a machine learning method 303.

The method 300 includes beginning with the logical composite validation query generator method 301 with a first step 310 of receiving a target data item validation request based on constituent parameters. Next, the logical composite validation query generator method 301 proceeds to a step 311 of parsing the request. The logical composite validation query generator method 301 proceeds to a step 312 of identifying the target data and data type which is to be validated. Continuing, the logical composite validation query generator method 301 has a next step 313 of identifying the primary criteria, or validation rules, against which the target data needs to be validated. Step 313 may be accomplished by a step 314 of cognitively suggesting primary validation ruled based on the target item data type. The logical composite validation query generator method 301 has a next step 315 of configuring and determining the specific configuration (such as parameter values) of the target object. The method 301 continues to a step 316 of loading the constituent parameters for the application required for the target data item. The he logical composite validation query generator method 301 has a next step 317 of iterating through the constituent parameters. The method 301 proceeds to a step 318 of obtaining the run time values of each constituent parameter from the request of step 310.

The logical composite validation query generator method 301 has a next step 319 of iterating through all of the possible combinations of constituent parameter and the values. The method 301 has a next step 320 of getting each individual combination of constituent parameters and their respective values. The logical composite validation query generator method 301 continues to a step 321 of appending the primary validation rules (of step 313) with the individual combination of constituent parameters and their respective values for the target object (of step 320). The method 301 continues to a next step 322 of attempting to generate composite validation rules. In step 323, it must be determined whether an error occurred in step 322. If an error has occurred, the logical composite validation query generator method 301 proceeds to the machine learning method 303, discussed below. If no error has occurred, the method proceeds to a step 324 of storing the composite validation rules in the data model for storing composite validation rule(s) per target data item in key value format 325.

The composite validation rules validator method 302 begins with a step 330 of preparing a request specific to constituent parameters and values, based on the request of step 310 (i.e., the request include the constituent parameters and values as configured in the request 310). Step 330 may include forming a single combination of the constituent parameters in key and value format. Next, the composite validation rules validator method 302 proceeds to a step 331 of identifying the stored generated composite rules (from step 324) based on run time. Step 331 may be accomplished by matching a key of the configured constituent parameters and values of step 330 with the stored composite validation rules in 325, which are stored in key value format. Continuing, the composite validation rules validator method 302 has a next step 332 of executing the composite validation rules against the target data. The composite validation rules validator method 302 has a step 333 of determining whether an error has occurred in step 332. If an error has occurred, the method proceeds to the machine learning method 303, discussed below. If it is determined that no error occurred in step 332, the method proceeds to a step 334 of obtaining a request specific validation result for the target item. This validation result of step 334 may then be returned to the application.

The machine learning method 303 has a first step 350 of analyzing a detected error. The error may have been detected in any part of method 300, but as shown the errors may be detected in steps 323 and 333. The machine learning method 303 has a next step 351 of getting the data field type (i.e., determining the data type). The machine learning method 303 has a next step 352 of getting a new primary rule set, based on the data field type. The machine learning method 303 has a last step of storing the new primary rule set of step 352 by the data field type of step 351 in the validation rule dictionary 354. The validation rule dictionary 354 may be the source of the cognitively suggested primary validation rules of step 314.

Figure 4:
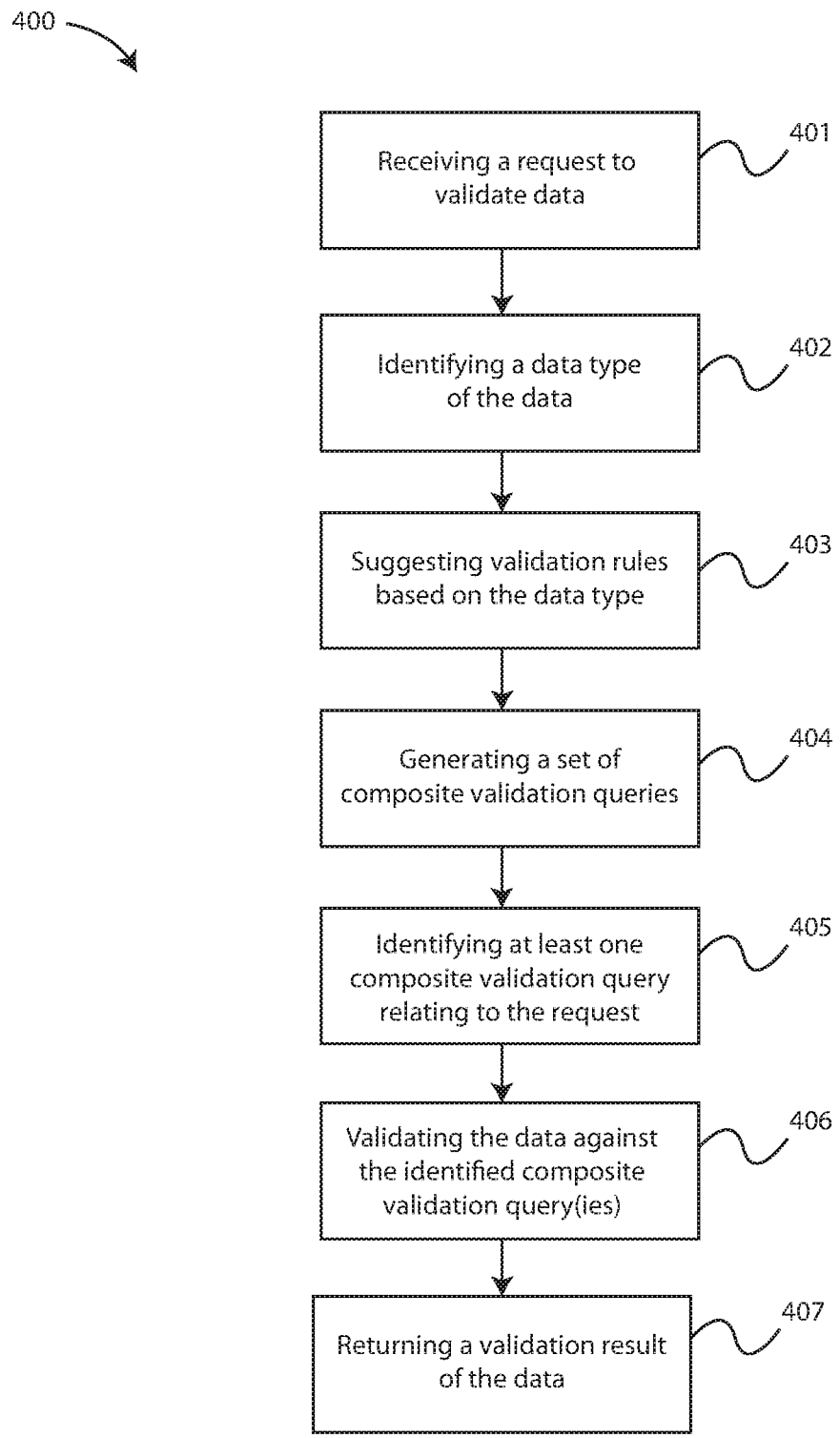
FIG. 4 depicts a flowchart of a method for multiple parameter based composite rule wise data validation, in accordance with embodiments of the present invention.

FIG. 4 depicts a flowchart of a method 400 for multiple parameter based composite rule wise data validation, in accordance with embodiments of the present invention. The method 400 begins with a step 401 of receiving a request to validate data. The request can be received from a separate application layer. The request to validate data can be based on one or more constituent parameters, as discussed above. The method 400 has a next step 402 of identifying a data type of the data to be validated. The method 400 continues to a next step 403 of suggesting validation rules based on the data type. These validation rules can be described as the primary validation rule set. The suggested validation rules can be based on the data type, the constituent parameters and/or the constituent parameter values in the request of step 401.

The method 400 proceeds to a next step 404 of generating a set of composite validation queries. The composite validation queries may be generated by generating all possible combinations of the constituent parameter values in the request of step 401 and then appending each combination with the suggested validation rules of step 403. The method 400 then proceeds to a step 405 of identifying at least one composite validation query relating to the request. Step 405 can be completed by storing the set of composite validation queries of step 404 in key value pair format wherein the key is the data item and the value is an individual composite validation query generated in step 404. A constituent parameter key pair can be formed based on the values of the constituent parameters in the request of step 401. Next, the constituent parameter key pair can be matched to at least one corresponding key pair of the stored composite validation queries, thus identifying the appropriate composite validation queries to validate the data based on the request.

The method 400 may then proceed to a next step 406 of validating data against the at least one identified composite validation query of step 405. This can be accomplished by executing the composite validation queries against the data of the request in step 401. The method 400 then continues to a step 407 of returning a validation result of the data based on the result of step 406. The result is returned to the location from which the request of step 401 originated. The result may, for example, be returned to an application.

As will be understood by one skilled in the art, the above described systems and methods advantageously decreases the complexity and increases the accuracy and speed of data validation by providing a separate, centralized validation layer capable of identifying the target data to be validated from a request, identifying the primary criteria against which the target data needs to be validated, suggesting primary validation rules based on the data type and the request, analyzing various parameters required for composite validation rules, and generating the composite validation rules. Embodiments of the present invention will improve computer functionality by validating a target data item of target data object without performing any application code, thereby increasing the efficiency of the computer. Furthermore, the present invention will result in an improvement in computer and data validation technology by reducing computer resource usage by offering a centralized validation engine for multiple applications to offload validation logic and rules.

Figure 5:
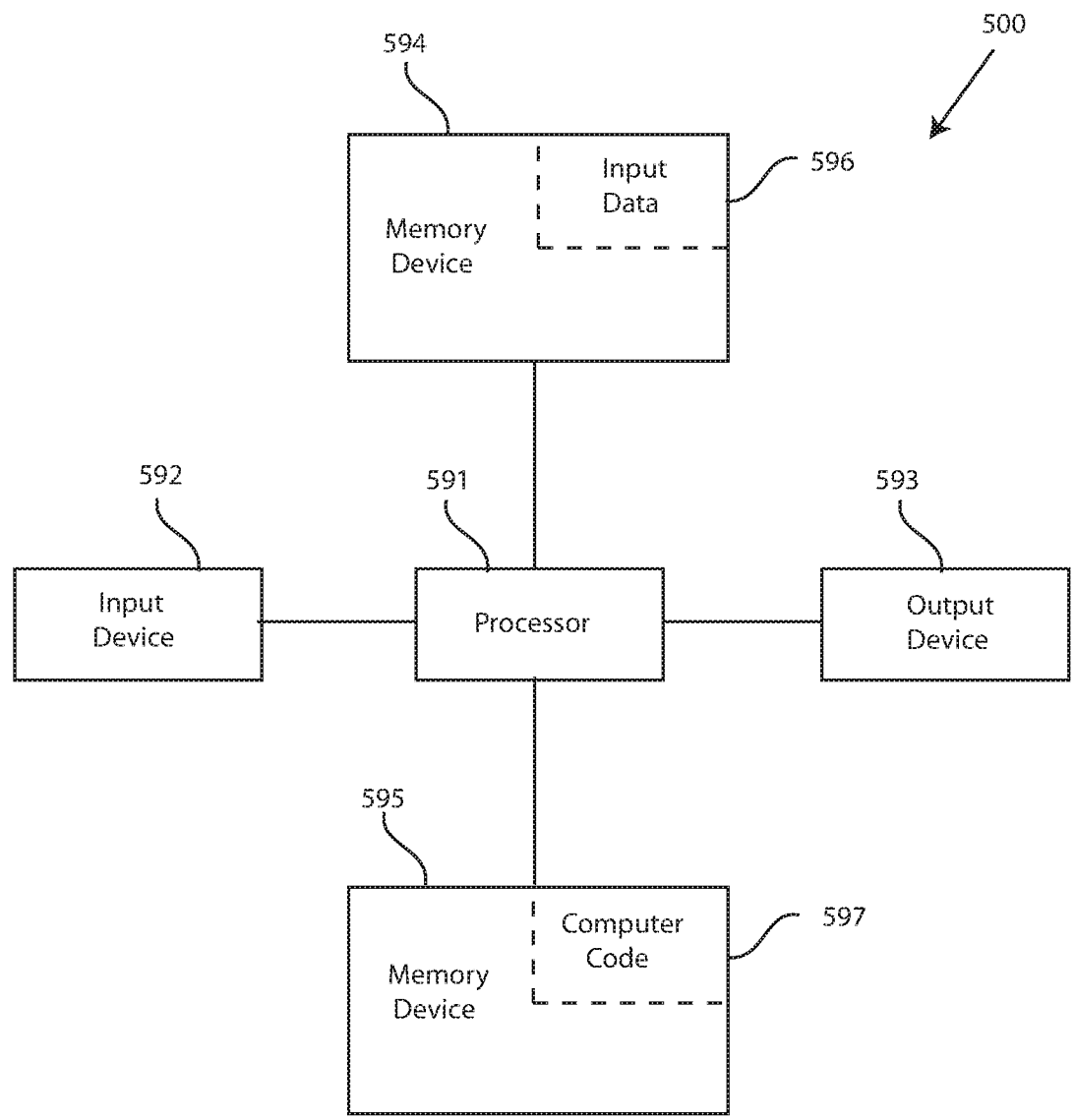
FIG. 5 illustrates a block diagram of a computer system for the system for multiple parameter based composite rule wise data validation of FIGS. 1-2, capable of implementing methods for multiple parameter based composite rule wise data validation of FIGS. 3-4, in accordance with embodiments of the present invention.

FIG. 5 illustrates a block diagram of a computer system 500 for the system for multiple parameter based composite rule wise data validation of FIGS. 1-2, capable of implementing methods for multiple parameter based composite rule wise data validation of FIGS. 3-4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for multiple parameter based composite rule wise data validation, in the manner prescribed by the embodiments of FIGS. 3-4 using the system for multiple parameter based composite rule wise data validation of FIGS. 1-2, wherein the instructions of the computer code 597 may be executed by processor 591 via memory device 595. The computer code 597 may include software or program instructions that may implement one or more algorithms for implementing the methods for multiple parameter based composite rule wise data validation, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 5.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for multiple parameter based composite rule wise data validation. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system for multiple parameter based composite rule wise data validation. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for multiple parameter based composite rule wise data validation. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for multiple parameter based composite rule wise data validation.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flow chart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least three deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a distributed system. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the distributed system infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Figure 6:
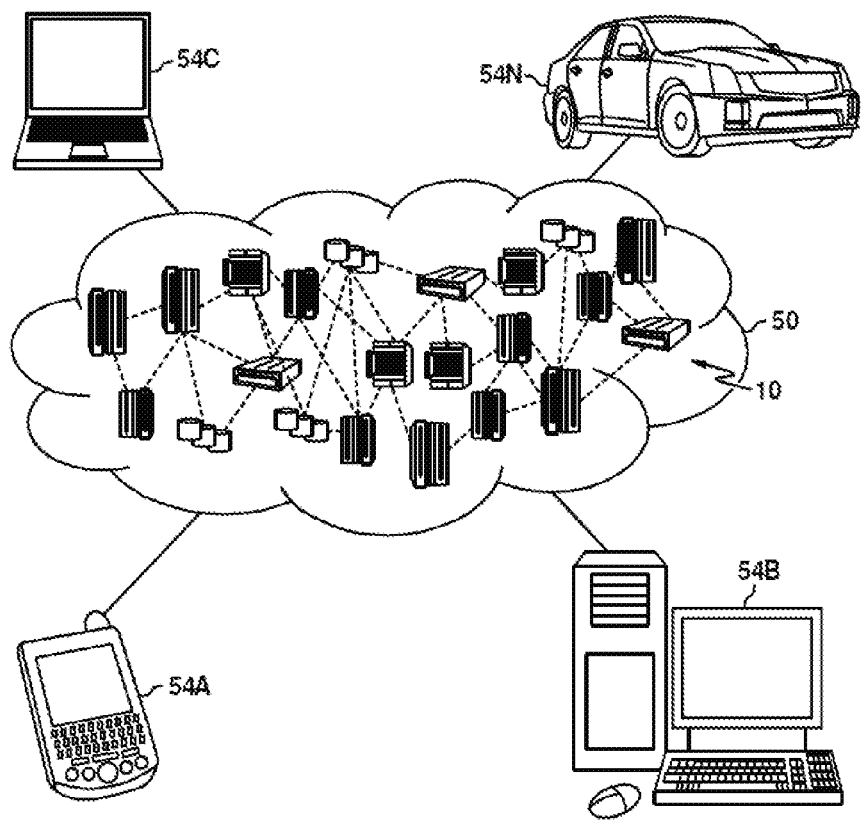
FIG. 6 depicts a distributed environment, in accordance with embodiments of the present invention.

FIG. 6 depicts a distributed environment 50, in accordance with embodiments of the present invention. As shown, distributed environment 50 includes one or more distributed systems computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows distributed environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that nodes 10 and distributed environment 50 can communicate with any type of computerized device over any type of network and/or network addressable connection (e.g., using a web browser).

Figure 7:
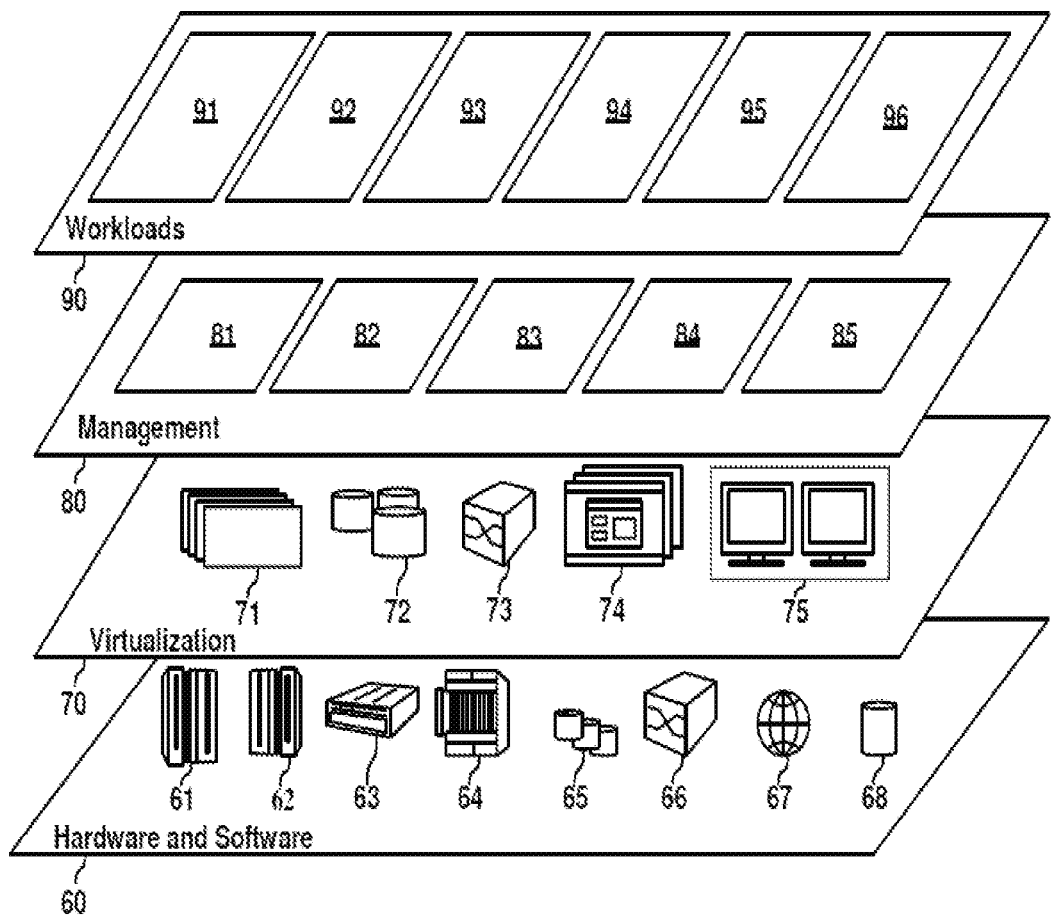
FIG. 7 depicts abstraction model layers, in accordance with embodiments of the present invention.

FIG. 7 depicts abstraction model layers, in accordance with embodiments of the present invention. A set of functional abstraction layers provided by distributed environment 50 (see FIG. 6) are shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and processing of directional guidance for an electric vehicle 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of multiple parameter based composite rule wise data validation, the method comprising:
    receiving, by one or more processors of a computer system, a request to validate target data of a target object based on constituent parameters and constituent parameter values;
    generating, by the one or more processors of the computer system, a set of composite validation queries, said set of composite validation queries being a plurality of validation queries;
    identifying, by the one or more processors of the computer system, at least one composite validation query in the set of composite validation queries corresponding to the constituent parameters and constituent parameter values;
    after said identifying, validating, by the one or more processors of the computer system, the received target data of the target object against the identified at least one composite validation query; and
    returning, by the one or more processors of the computer system, a validation result for the target data of the target object, said validation result being a result of said validating.

2. The method of claim 1, wherein the generating the set of composite validation queries includes:
    generating, by the one or more processors of the computer system, all possible combinations of the constituent parameter values;
    suggesting, by the one or more processors of the computer system, validation rules based on a data type of the target object, the constituent parameters, and the constituent parameter values; and
    appending, by the one or more processors of the computer system, each combination of the constituent parameter values with the suggested validation rules.

3. The method of claim 1, the method further comprising:
    storing, by the one or more processors of the computer system, the set of composite validation queries in key-value pair format;
    forming, by the one or more processors of the computer system, a constituent parameter key pair based on the values of the constituent parameters in the request;
    wherein the identifying includes matching, by the one or more processors of the computer system, constituent parameter key pair to at least one corresponding composite validation query key pair.

4. The method of claim 2, the method further comprising:
    wherein the appending includes detecting, by the one or more processors of the computer system, an error when forming the set of composite validation queries;
    analyzing, by the one or more processors of the computer system, the error;
    obtaining, by the one or more processors of the computer system, a new validation rule based on the error and the data type;
    storing, by the one or more processors of the computer system, the new validation rule in a validation rule dictionary according to the data type;
    wherein the suggesting includes suggesting, by the one or more processors of the computer system, a validation rule from the validation rule dictionary.

5. The method of claim 1, wherein the receiving includes receiving, by the one or more processors of the computer system, the request from an application and the returning includes returning, by the one or more processors of the computer system, the validation result to the application.

6. The method of claim 5, wherein the receiving includes receiving, by the one or more processors, requests from a plurality of applications in a cluster environment and wherein the same set of composite validation queries are utilized for each request.

7. The method of claim 1, wherein the constituent parameters include a request state, a user role, and a document state.

8. A computer system, comprising: one or more processors; one or more memory devices coupled to the one or more processors; and one or more computer readable storage devices coupled to the one or more processors, wherein the one or more storage devices contain program code executable by the one or more processors via the one or more memory devices to implement a method of multiple parameter based composite rule wise data validation, the method comprising:
    receiving, by one or more processors of a computer system, a request to validate target data of a target object based on constituent parameters and constituent parameter values;
    generating, by the one or more processors of the computer system, a set of composite validation queries, said set of composite validation queries being a plurality of validation queries;
    identifying, by the one or more processors of the computer system, at least one composite validation query in the set of composite validation queries corresponding to the constituent parameters and constituent parameter values;
    after said identifying, validating, by the one or more processors of the computer system, the received target data of the target object against the identified at least one composite validation query; and
    returning, by the one or more processors of the computer system, a validation result for the target data of the target object, said validation result being a result of said validating.

9. The computer system of claim 8, wherein the generating the set of composite validation queries includes:
    generating, by the one or more processors of the computer system, all possible combinations of the constituent parameter values;

suggesting, by the one or more processors of the computer system, validation rules based on a data type of the target object, the constituent parameters, and the constituent parameter values; and appending, by the one or more processors of the computer system, each combination of the constituent parameter values with the suggested validation rules.

10. The computer system of claim 8, the method further comprising:
    storing, by the one or more processors of the computer system, the set of composite validation queries in key-value pair format;
    forming, by the one or more processors of the computer system, a constituent parameter key pair based on the values of the constituent parameters in the request;
    wherein the identifying includes matching, by the one or more processors of the computer system, constituent parameter key pair to at least one corresponding composite validation query key pair.

11. The computer system of claim 9, the method further comprising:
    wherein the appending includes detecting, by the one or more processors of the computer system, an error when forming the set of composite validation queries;
    analyzing, by the one or more processors of the computer system, the error;
    obtaining, by the one or more processors of the computer system, a new validation rule based on the error and the data type;
    storing, by the one or more processors of the computer system, the new validation rule in a validation rule dictionary according to the data type;
    wherein the suggesting includes suggesting, by the one or more processors of the computer system, a validation rule from the validation rule dictionary.

12. The computer system of claim 8, wherein the receiving includes receiving, by the one or more processors of the computer system, the request from an application and the returning includes returning, by the one or more processors of the computer system, the validation result to the application.

13. The computer system of claim 12, wherein the receiving includes receiving, by the one or more processors, requests from a plurality of applications in a cluster environment and wherein the same set of composite validation queries are utilized for each request.

14. The computer system of claim 8, wherein the constituent parameters include a request state, a user role, and a document state.

15. A computer program product, comprising a computer readable hardware storage device storing a computer readable program code, the computer readable program code comprising an algorithm that when executed by one or more processors of a computer system implements a method of multiple parameter based composite rule wise data validation, the method comprising:
    receiving, by one or more processors of a computer system, a request to validate target data of a target object based on constituent parameters and constituent parameter values;
    generating, by the one or more processors of the computer system, a set of composite validation queries, said set of composite validation queries being a plurality of validation queries;
    identifying, by the one or more processors of the computer system, at least one composite validation query in the set of composite validation queries corresponding to the constituent parameters and constituent parameter values;
    after said identifying, validating, by the one or more processors of the computer system, the received target data of the target object against the identified at least one composite validation query; and
    returning, by the one or more processors of the computer system, a validation result for the target data of the target object, said validation result being a result of said validating.

16. The computer program product of claim 15, wherein the generating the set of composite validation queries includes:
    generating, by the one or more processors of the computer system, all possible combinations of the constituent parameter values;
    suggesting, by the one or more processors of the computer system, validation rules based on a data type of the target object, the constituent parameters, and the constituent parameter values; and
    appending, by the one or more processors of the computer system, each combination of the constituent parameter values with the suggested validation rules.

17. The computer program product of claim 15, the method further comprising:
    storing, by the one or more processors of the computer system, the set of composite validation queries in key-value pair format;
    forming, by the one or more processors of the computer system, a constituent parameter key pair based on the values of the constituent parameters in the request;
    wherein the identifying includes matching, by the one or more processors of the computer system, constituent parameter key pair to at least one corresponding composite validation query key pair.

18. The computer program product of claim 16, the method further comprising:
    wherein the appending includes detecting, by the one or more processors of the computer system, an error when forming the set of composite validation queries;
    analyzing, by the one or more processors of the computer system, the error;
    obtaining, by the one or more processors of the computer system, a new validation rule based on the error and the data type;
    storing, by the one or more processors of the computer system, the new validation rule in a validation rule dictionary according to the data type;
    wherein the suggesting includes suggesting, by the one or more processors of the computer system, a validation rule from the validation rule dictionary.

19. The computer program product of claim 15, wherein the receiving includes receiving, by the one or more processors of the computer system, the request from an application and the returning includes returning, by the one or more processors of the computer system, the validation result to the application.

20. The computer program product of claim 19, wherein the receiving includes receiving, by the one or more processors, requests from a plurality of applications in a cluster environment and wherein the same set of composite validation queries are utilized for each request.

* * * * *